Aug. 27, 1935.    B. A. BEAN, JR    2,012,804
PARKING ELECTRIC WINDSHIELD CLEANER
Filed March 7, 1929
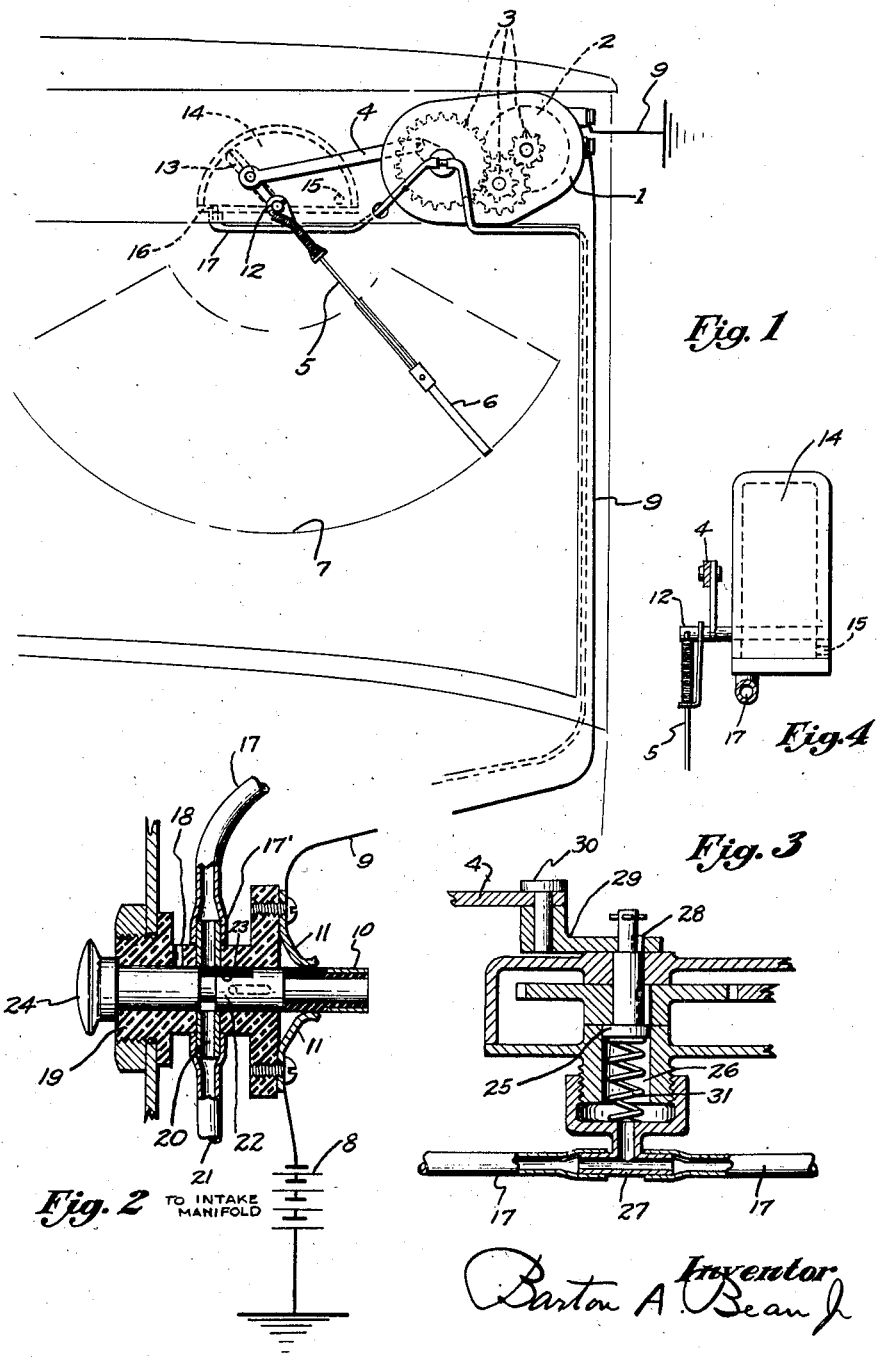

Patented Aug. 27, 1935

2,012,804

UNITED STATES PATENT OFFICE 2,012,804

PARKING ELECTRIC WINDSHIELD CLEANER

Barton A. Bean, Jr., Williamsville, N. Y., assignor to Trico Products Corporation, Buffalo, N. Y.

Application March 7, 1929, Serial No. 345,147

14 Claims. (Cl. 15—255)

This invention relates to the parking of windshield cleaner wiper blades out of the field of vision, the same being an improvement on Patent No. 1,674,056 granted to John R. Oishei and Henry Hueber on June 19, 1928, wherein is disclosed a windshield cleaner having means for shunting or directing the power to the cleaner motor in such a manner as to urge the wiper blade out of the field of vision, or to one side thereof, when the main source of power is disconnected from the windshield cleaner motor.

The present invention applies the broad inventive concept of the above noted patent specifically to the electric windshield cleaner.

The arrest of the wiper blade of an electric windshield cleaner in a definite position has been a problem to the user of the electric windshield cleaner and has long challenged invention. When the electric current is shut off from the electric windshield cleaner, there is usually a sufficient amount of momentum to carry the wiper blade on for a considerable distance, this distance varying in the presence of certain factors such as the surface resistance of the windshield glass to the wiper blade, the friction in the moving parts, etc. Consequently, the parking of the wiper blade in an electric windshield cleaner becomes more or less guess work on the part of the driver of the automobile and constitutes a source of annoyance and distraction from his control of the vehicle.

The object of the present invention is to provide an electric windshield cleaner in which the wiper blade is definitely and automatically parked out of the line of vision when the motor circuit is broken.

The invention further has for its objects to provide an electric windshield cleaner with a special parking motor; to provide an electric cleaner adapted to be parked by fluid pressure; to provide means for uncoupling the wiper from the electric cleaner to permit of such parking; and to provide against creeping movement of the wiper from a parked position to a position across the line of vision.

In the drawing,

Fig. 1 is an elevation of an electric windshield cleaner embodying the present invention.

Fig. 2 is a sectional view depicting a combined operating and parking control for the cleaner.

Fig. 3 is a sectional view through the wiper clutch assembly.

Fig. 4 is a side elevation of the parking motor.

Referring more in detail to the accompanying drawing, the numeral 1 designates the electric windshield cleaner power unit consisting, broadly, of an electric motor 2, reduction gearing 3 and a transmission link 4, the latter connecting the gearing to the wiper carrying arm 5 and imparting an oscillatory movement thereto and to the wiper blade 6 whereby the latter is caused to travel an arcuate path, indicated by the broken lines 7. The source of electrical energy 8 for the windshield cleaner motor is electrically connected thereto by circuit wires 9, and the circuit is opened and closed by a circuit breaker, for example, as by a contact part 10 establishing electrical connection with the contacts 11.

The wiper carrying arm 5 is mounted on a shaft 12 which shaft is connected to a piston 13 operating in a chamber 14 so that as the wiper blade oscillates over the windshield glass the piston 13 will also reciprocate within its chamber 14, the latter being normally open to the atmosphere at opposite sides of the piston to avoid undue resistance from fluid pressure. To this end, there is provided at one side of the piston an atmospheric port 15, while at the opposite side of the piston the chamber is provided with a port 16 which is connected by a conduit 17 to an atmospheric port 18, communication with the latter port being established through the combined operating and parking control illustrated in Fig. 2.

This control comprises a valve casing 19 having the port 18 therein, a port 17' therein connected to the conduit 17, and an exhaust port 20 therein which is connected by a conduit 21 to a source of operating pressure, such as the intake manifold of the motor vehicle engine. A valve 22 is operable in the casing 19 to intercept communication between the ports 17' and 20 and to simultaneously connect the port 17' to the atmospheric port 18, as by the valve passage 23. A suitable knob or handle 24 is provided for shifting the valve to effect the desired communications between the several ports. To the valve is connected the contact member 10 so that when both sides of the chamber 14 are open to the atmosphere, in which position port 20 will be closed and port 17' and 18 connected, the contact 10 is closing the operating circuit through contacts 11 so that the electric motor of the windshield cleaner will be supplied with electric current for operating the wiper. Such a position of parts will be assumed upon withdrawing the handle 24.

When it is desired to arrest the wiper the knob 24 is pushed inwardly so as to open the electric circuit, close the atmospheric port 18 to the chamber 14, and establish communication between the intake manifold of the engine and the chamber 14 through the port 16. This action will create a suction at one side of the piston 13 so as to urge the latter toward that end of the chamber, and this constant urging will tend to move the wiper blade 6 toward one end of its path of movement and hold it out of the line of vision.

If the reduction gearing mechanism is of such a character as to effectually resist the parking of the cleaner, it is within the purview of this invention to uncouple the wiper from those parts of the mechanism, and to this end there is provided a coupler or clutch which is herein shown as being pneumatically operated and connected to the suction line 17. One embodiment of this coupler is shown in Fig. 3 wherein a suction responsive member or piston 25 is disposed in a chamber 26 from which the pressure is lowered by reason of its connection 27 with said suction line 17. The suction responsive member 25 is connected to a key part 28 for withdrawing the latter from operative relation to a rotating part 29 to which the link 4 is connected as by a crank pin 30. Consequently, inward movement of the member 25, in response to suction, will withdraw the key part 28 from the member 29 and uncouple the latter from the power unit of the windshield cleaner whereby the wiper will be free to be parked under the influence of suction acting on the piston 13. When it is desired to again operate the windshield cleaner the vacuous condition in the chamber 26 will be broken to permit of a spring 31 projecting the key part 28 into coupled relation with the member 29, as illustrated in Fig. 3.

From the foregoing it is believed that the operation and parking of the wiper will be obvious, the power supplied to the windshield cleaner motor being interrupted simultaneously with the application or directing of the parking power to the parking mechanism as well as to the uncoupling mechanism. When it is again desired to cause the windshield cleaner to function the parking mechanism and coupling mechanism are opened to the atmosphere simultaneously with the closing of the motor circuit.

Both the parking action and the uncoupling of the wiper from its electric motor are accomplished through fluid-pressure-operated instrumentalities and, therefore, the desired elasticity in the operation of the mechanisms is performed without severe and injurious strains.

What is claimed is:

1. A windshield cleaner comprising an electric motor, a wiper element operable thereby, means for effecting a parking of the wiper element, and a combined control for the motor and parking means connected to the motor and parking means for selectively rendering either said motor or said parking means operative.

2. In combination with an electric motor unit and a windshield wiper detachably coupled thereto, means for uncoupling the wiper from said motor unit, and a combined control for interrupting the power supplied to the unit and rendering said means operative to uncouple the wiper from the unit.

3. A windshield cleaner comprising a power unit, a wiper coupled thereto, wiper parking mechanism, means for uncoupling the wiper from the power unit, and a combined control for rendering the power unit inoperative, for uncoupling the wiper therefrom and for rendering the parking mechanism operative.

4. A windshield cleaner comprising an electric power unit, a wiper connected therewith and operable thereby, means for disconnecting the wiper from said unit, an actuator operated by fluid pressure means for parking the wiper when disconnected from the unit, and control means for rendering said power unit inoperative and for simultaneously rendering said disconnecting means and said actuator operative.

5. A windshield cleaner comprising an electric power unit, a wiper connected therewith and operable thereby, means for disconnecting the wiper from said unit, said disconnecting means comprising a coupler part and fluid pressure means for moving the part to an inoperative position, and fluid pressure means for parking the wiper when disconnected from the unit, said disconnecting means and said parking means having a common control.

6. A windshield cleaner comprising an electric power unit, a wiper connected therewith and operable thereby, means for disconnecting the wiper from said unit, a parking actuator for parking the windshield wiper when said wiper is disconnected from the unit, and a common control for said disconnecting means and said parking actuator.

7. A windshield cleaner comprising an electric power unit, a wiper connected therewith and operable thereby, means for disconnecting the wiper from said unit, said means including a fluid pressure actuator, a parking actuator for parking the windshield wiper when said wiper is disconnected from the unit, said parking actuator being fluid-pressure-operated, and comprising a fluid pressure chamber, a piston therein operatively connected to the wiper, and fluid pressure passages extending to said chamber and to said means for disconnecting the wiper from said unit, and a common control for said unit and said fluid passages.

8. A windshield cleaner comprising an electric power unit, a wiper operably connected therewith, a parking actuator for parking the windshield wiper, said actuator being fluid-pressure-operated, and comprising a fluid pressure chamber, a piston therein operatively connected to the wiper, and a fluid pressure connection to said chamber, a shaft on which said wiper arm is connected, said piston being connected to said shaft, and said unit being connected to said shaft, and a combined operative and parking control for said unit and said parking actuator.

9. A windshield cleaner comprising an electric circuit, a power unit therein, a wiper operably connected therewith, a fluid pressure actuator connected to the wiper for parking the same and comprising a shaft to which the wiper is connected, a piston connected to the shaft, a chamber in which the piston operates, and a combined power unit and parking control for controlling the flow of fluid through the actuator simultaneously controlling the electric circuit to said unit.

10. In a windshield cleaner, a wiper, power drive means for actuating the wiper, other means for exerting an urge upon the wiper for moving the wiper to a parked position, means for operatively dissociating the wiper and said power drive means, and means associating said dissociating means and said other means for rendering the latter effective when said dissociating means is effective.

11. In a windshield cleaner, a wiping element, power operated parking means associated with said element for urging it to a parked position, separate power actuating means for operating the wiper element in normal wiping action, control means for simultaneously rendering the power actuating means inoperative and the parking means operative.

12. In a windshield cleaner, a wiping element, power operated parking means for urging the wiper to a parked position, a separate power drive for actuating the wiping element in normal wiping action, means for rendering the power drive ineffective to actuate the wiper, and means associating the last mentioned means and the parking means for rendering the parking means effective when the power drive is rendered ineffective.

13. In a windshield cleaner, a wiping element, parking means for urging the wiper to a parked position, power drive means operating independently of the parking means and coupled to the wiping element for actuating the latter in normal wiping action, means for uncoupling the power drive means from the wiping element, and means associating the uncoupling means and parking means for causing the parking means to become effective when the power drive means is uncoupled from the wiping element.

14. In a windshield cleaner, a wiping element, power operated parking means for urging the wiper to a parked position, a power drive operating independently of said parking means for actuating the wiping element in normal wiping action, and means for operatively dissociating the wiper from said power drive, whereby the parking means may act upon the wiping element without acting upon the power drive.

BARTON A. BEAN, Jr.